United States Patent [19]

Harris

[11] Patent Number: 5,303,583
[45] Date of Patent: Apr. 19, 1994

[54] METER BOUNDARY BOX

[75] Inventor: Wayne A. Harris, North Plympton, Australia

[73] Assignee: Philmac Pty, Ltd., North Plympton, Australia

[21] Appl. No.: 722,962

[22] Filed: Jun. 28, 1991

[30] Foreign Application Priority Data

Jun. 29, 1990 [AU] Australia ............... PK0921

[51] Int. Cl.⁵ ............................................. G01F 15/18
[52] U.S. Cl. ......................................... 73/201; 73/273
[58] Field of Search .................................. 73/201, 273

[56] References Cited

U.S. PATENT DOCUMENTS 4,829,482 4/1989 Rappart et al. .................. 73/201

FOREIGN PATENT DOCUMENTS 0125010 11/1984 European Pat. Off. .
0327972 8/1989 European Pat. Off. ............ 73/201
0105758 5/1991 European Pat. Off. .
3740531 5/1990 Fed. Rep. of Germany .
PCT
HU8700002 of 1987 PCT Int'l Appl. .

Primary Examiner—Herbert Goldstein
Attorney, Agent, or Firm—Brown, Martin, Haller & McClain

[57] ABSTRACT

A meter boundary box comprises an outer casing which is upstanding from a base, the outer casing containing a tubular housing with a lid thereon, the lid engaging the housing so that rotation of the lid effects rotation of the housing but arranged so that the lid can be lifted away from the housing, the housing containing a meter which is threadably engaged in a valve member, the valve member itself threadably engaging a manifold which incorporates the inlet and outlet conduits, the arrangement being such that by rotation of the lid, firstly the valve member can be closed and secondly the meter can be unscrewed from the valve member for easy removal.

9 Claims, 3 Drawing Sheets

METER BOUNDARY BOX

This invention relates to a meter boundary box for containing a water meter of the type which has an externally threaded wall of a tail located radially between a water inlet port which is external of the tail and a water outlet port which is defined by the tail, and is particularly directed to a boundary box which is housed beneath the surface of the ground.

In some applications in meter boundary boxes it is desirable that they should be housed below the surface of the ground, firstly to protect the meter, secondly to enable the meter to be positioned deep enough in the ground so as to avoid freezing of water in the pipes and thirdly, to enable a meter to be retained in a public road or footpath, while still providing suitable access for the meter to be read.

PRIOR ART

It is known that some constructions have been proposed heretofore and included amongst them is a construction wherein a water tight housing contains a meter, and the meter surmounts a manifold which includes a valve for closing off the flow of water from an inlet conduit to an outlet conduit. The whole arrangement is usually carried on a base and is surrounded by an outlet casing. Other relevant prior art includes a German Patent specification DE 37 40 531 C2, a European patent application 0125010, a European application 0105758, and a PCT Application PCT/HU87/00002. It is though the most relevant of these is probably the specification 0125010. However, the concept therein is somewhat different from the concept of this invention in that the pipes were arranged to move vertically upwardly into a metering apparatus which was located closer to the surface of the ground, and the pipes were insulated to reduce the incidence of freezing.

A main object of this invention is to provide a means whereby a meter can be quickly and easily removed with appropriate tools but will be difficult to remove without appropriate tools, and upon removal the entire assembly of the boundary box is readily accessible through this outer casing. Secondly, it is an object to provide a means whereby the valve necessarily contained in such a box for closing off water supply can be closed without removing the meter.

BRIEF SUMMARY OF THE INVENTION

Briefly in this invention, a meter boundary box comprises an outer casing which is upstanding from a base, the outer casing containing a tubular housing with a lid thereon, the lid engaging the housing so that rotation of the lid effects rotation of the housing but arranged so that the lid (38) can be lifted away from the housing, the housing containing a meter which is threadably engaged in a valve member, the valve member itself threadably engaging a manifold which incorporates the inlet and outlet conduits, the arrangement being such that by rotation of the lid, the valve member can be closed. Further, the meter can be unscrewed from the valve member within the outer casing for easy removal.

More specifically, in this invention a meter boundary box for housing a water meter of the type having an externally threaded wall of a tail located radially between a water inlet part external of the tail and a water outlet port defined by the tail wall, comprising a base having upwardly extending surfaces defining a pair of conduit locating apertures, a manifold having projecting inlet and outlet conduits located by the surfaces of respective said apertures, valve seat surfaces defining a valve seat of a closure valve opening at its upstream side to the inlet conduit, a sleeve having an internal thread extending downstream of the valve, an internal thread in the sleeve, a valve member threadably engaging the sleeve thread to thereby be co-operable with the valve seat to open or close the closure valve, an upwardly open internal thread in the valve member of diameter and pitch to receive the threaded meter tail, the valve member having an internal wall surrounding in outlet passage open to the manifold outlet conduit, a tubular housing extending upwardly from the valve member and having its lower end sealably but releasably engaging the valve member, and a lid sealably engaging an upper end of the housing.

BRIEF DESCRIPTION OF THE DRAWINGS

An embodiment of the invention is described hereunder in some detail with reference to and is illustrated in the accompanying drawings in which.

DETAILED DESCRIPTION OF THE PREFERRED EMBODIMENT

Figure 1:
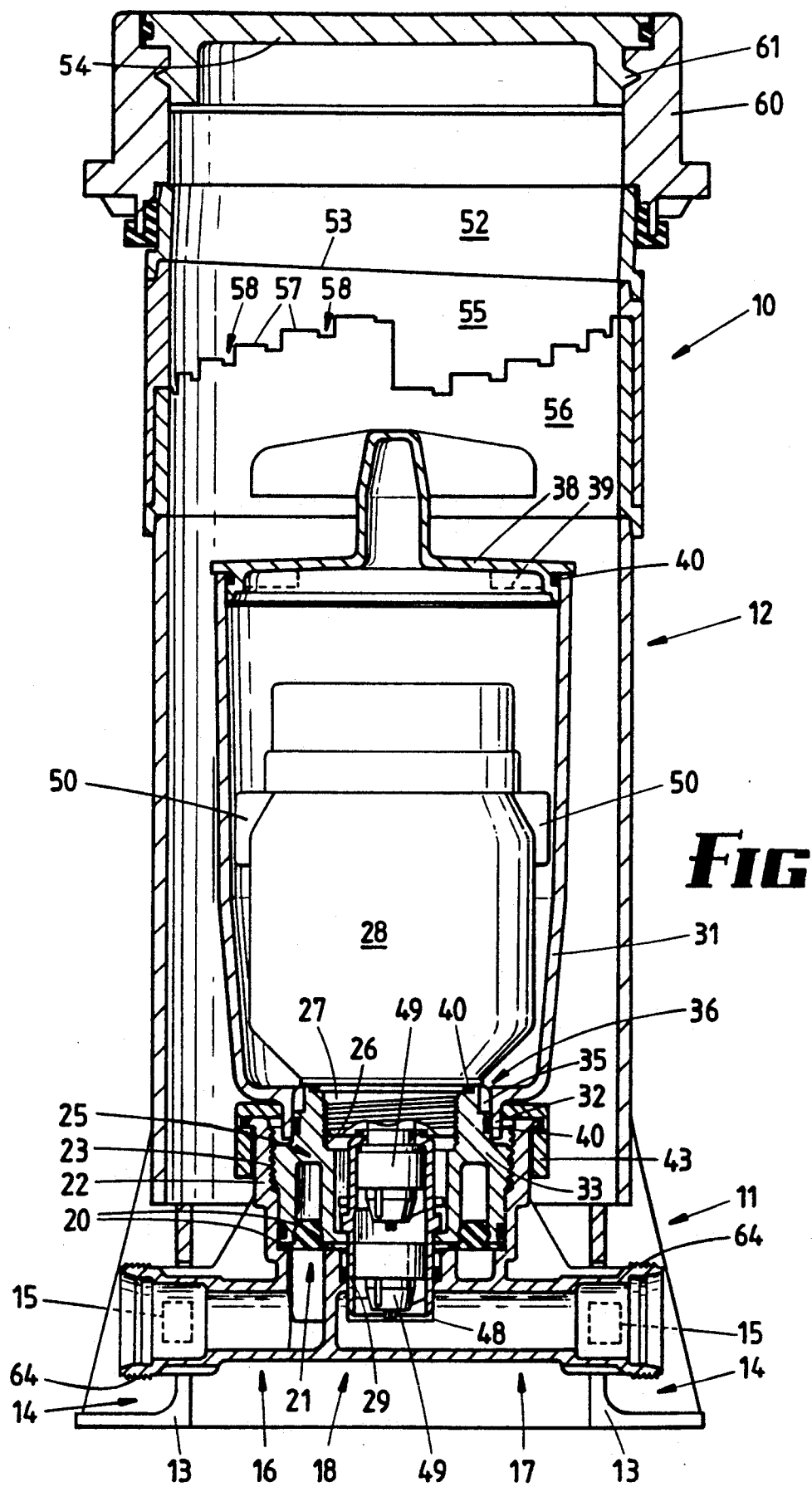
FIG. 1 is a central elevational section through a meter boundary box which embodies features of the invention.

In this embodiment a meter boundary box 10 comprises a base 11 which supports a casing 12 and the base 11 is provided with upwardly extending slot surfaces 13 which form slots 14, the surfaces 13 being spaced apart by a distance which enables pads 15 on the sides of inlet and outlet conduits 16 and 17 of a manifold 18 to be guided for vertical movement as may be rendered necessary by the position of pipes to which the boundary box needs to be coupled.

The manifold 18 comprises a pair of radially spaced annular valve seat surfaces 20. Manifold 18 opens at its upstream side to the inlet conduit 16, the manifold also having an upwardly directed sleeve 22 extending in a downstream direction (upwardly as shown in FIG. 1), and the sleeve 22 has an internal thread 23.

A valve member 25 has an external thread 24 that engages internal thread 23 of sleeve 22. A closure valve 21 is defined by the relative movement between valve member 25 and valve seat surfaces 20. Screwing valve member 25 towards valve seat surfaces 20 closes closure valve 21, thereby preventing water from flowing from inlet conduit 16 to outlet conduit 17. Screwing valve member 25 away from valve seat surfaces 20 opens closure valve 21, thereby allowing water to flow from inlet conduit 16 to outlet conduit 17. Valve member 25 (FIGS. 2 and 3) has an upwardly open internal thread 26 which receives a threaded tail 27 of a meter 28. The manifold member 18 also has an internal wall 29 which surrounds an outlet passage open to the outlet conduit 17 as described below.

Figure 2:
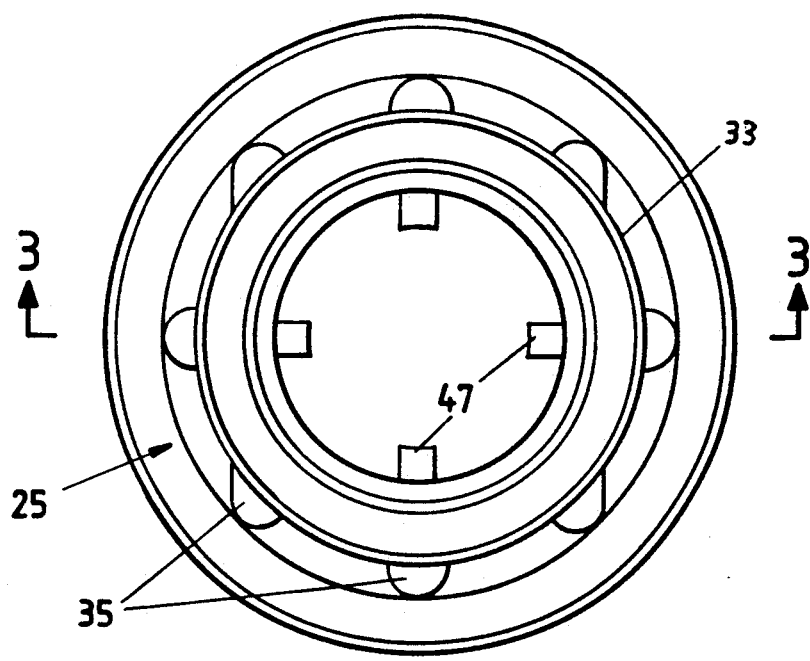
FIG. 2 is a top view of a valve member which is illustrated in FIG. 1, FIG. 2 being drawn to a larger scale.
Figure 3:
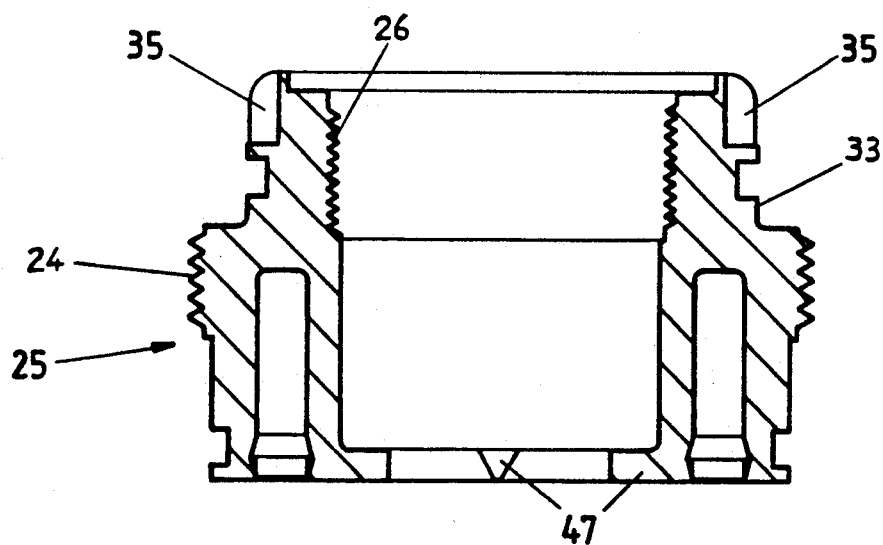
FIG. 3 is a section taken on line 3—3 of FIG. 2.

A tubular housing 31 surrounds a meter 28, the tubular housing terminating at its lower end in a skirt 32 which slidably but sealably engages the outer surface of a boss 33 of the valve member 25, and is of such shape that when the meter 28 is screwed into the internal thread 26 of the boss 33, the lower end of the meter retains the skirt 32 captive against any axial movement. As best seen in FIGS. 2 and 3, the valve member 25 is provided with a plurality of radially outstanding ribs 35 (of two pattern shapes) and these ribs engage in complementary slots 36 in the skirt 32 so that no rotation can take place between the valve member 25 and the tubular housing 31. The upper end of the tubular housing 31 receives a lid 38 which has a circumferential registers 39 to avoid relative rotation between the lid 38 and the tubular housing 31. Upper and lower seal rings both designated 40 ensure that the tubular housing and lid provide a water tight receptacle for the meter 28.

Figure 4:
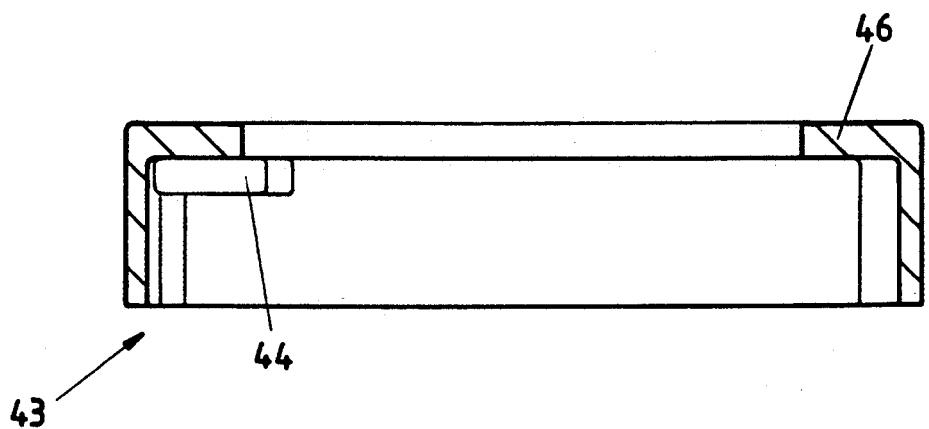
FIG. 4 is a central section of a bayonet ring which is shown to a larger scale than in FIG. 1.
Figure 5:
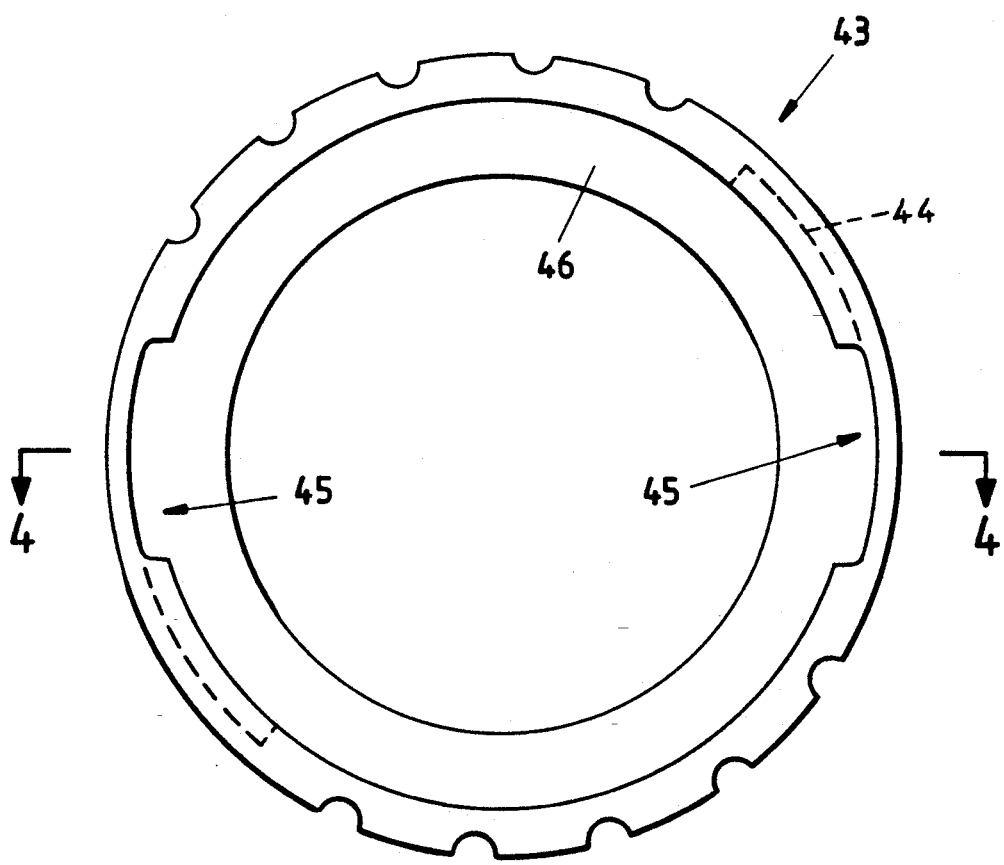
FIG. 5 is a bottom view of FIG. 4, and showing a line of 4—4 which identifies the locality of the central section thereof.

When it is desired to open the closure valve 21, this is therefore achieved by merely rotating the lid 38 in an anticlockwise direction and this in turn transfers torque through the tubular housing 31 to the valve member 25, but to prevent inadvertent release of the valve member 25 from the manifold 18, there is provided a retention ring 43 (FIGS. 4 and 5) and the retention ring 43 has a left hand bayonet recess 44 and slot 45 which will resist further rotation once the inwardly directed flange is abutted by the upwardly moving and rotating valve member 25.

A situation frequently exists in that there is pressure on the downstream side of a valve, and in order to prevent that pressure causing flooding when the meter has been removed, the internal wall 29 of the valve member has triangular retaining tongues 47 (FIG. 3) which retain within it a holder 48 which retains one or more non-return valves 49 of known type, in this embodiment being valves which are available from Watts Ocean dv, Kollergang 14, Eerdeek, The Netherlands.

In use, removal of a meter needs to be achieved by employment of a special two-part tool, one part of which will engage the registers 39 in the top of the tubular housing 31 after the lid 38 has been lifted away, and the other part of which engages the outstanding lugs 50 which are portions of the meter 28. This arrangement enables the tail 27 to be unscrewed from the internal thread 26 of the valve member 25. However before this occurs, this valve member 25 is rotated by that part of the tool which engages it to a closed position when the annular closure valve 21 seals against the valve seat surfaces 20, and must be held closed while the other tool part unscrews the tail.

As said, the meter boundary box may be required to be buried in the ground at the location of a footpath or road, wherein a camber is necessary for drainage purposes. If that occurs, the upper end of the meter box will not be normal to the vertical axis of the meter 28 as illustrated in FIG. 1, but will be required to slope, and use is therefore made of spacer rings 52 (only one being shown in FIG. 1 but several may be used) and the spacer ring or rings 52 are provided with sloping edges 53 as shown. This arrangement is already known in the art. However, besides varying the slope of the closure lid 54 which surmounts the meter boundary box 10, use is made of a secondary spacer combination 55 and 56 which comprises a pair of matching rings with castellated steps 57 between which there exist notches 58, and the contiguous edges comprise portions which slope in a generally spiral manner. The circumferential length of each of the catellated steps 57 is identical, so that by lifting the secondary spacer 55 from the other secondary spacer 56 and rotating it, a different elevation of the closure lid 54 is achieved, whether or not the sloping spacer rings 52 are utilised.

As seen in FIG. 1, surmounting the spacer rings 52 there is a short but heavy tubular nut 60 which receives a coarse thread 61 of a closure lid 54, and each component down to the casing 12 overlaps the component beneath it circumferentially for shedding of water which moves downwardly.

The inlet and outlet conduit 16 and 17 are both provided with male buttress threads 64 and these receive nuts of varying dimension depending upon the size of pipe which must be connected, in the use of fittings which may for example be as described in our patent specifications relating to the UK patents 2002079, 8822413.4, U.S. Pat. No. 4,822,082 or Australian Patents 520863 and 534452.

Although a preferred embodiment of the invention has been described, it will be understood by those skilled in the field that modifications may be made to the disclosed embodiment without departing from the spirit and scope of the invention, which is defined by the appended claims.

I claim:

1. A meter boundary box for housing a water meter of the type having an externally threaded wall of a tail located radially between a water inlet port external of the tail and a water outlet port defined by the tail wall, comprising a base having upwardly projecting surfaces defining a pair of conduit locating apertures, a manifold having projecting inlet and outlet conduits located by the surfaces of respective said apertures, valve seat surfaces defining a valve seat opening at its upstream side to the inlet conduit, and a sleeve having an internal thread extending downstream of the valve seat, a closure valve for controlling water flow from said inlet conduit to said outlet conduit, said closure valve comprising said valve seat and a valve member having an external thread for engaging the internal thread of the sleeve to thereby move the valve member axially with respect to the valve seat to open or close the closure valve, the valve member having an upwardly open internal thread of diameter and pitch to receive the threaded meter tail, the valve member having an internal wall surrounding an outlet passage open to the manifold outlet conduit, and a tubular housing extending upwardly from the valve member and having its lower end sealably but releasably engaging the valve member, and a lid sealably engaging an upper end of the housing.

2. A meter boundary box according to claim 1 wherein said valve seat surfaces of the closure valve comprise a pair of radially spaced annular surfaces.

3. A meter boundary box according to claim 1 wherein an upper end of said valve member comprises a boss, said internal thread being a thread of the boss.

4. A meter boundary box according to claim 3 wherein said boss and tubular housing comprise inter-engaging non-circular surfaces which inhibit relative rotation.

5. A meter boundary box according to claim 1 wherein an upper end of said valve member comprises a boss having a plurality of vertical surfaces defining upwardly extending slots, said tubular housing lower end having a plurality of radially extending projections slidably engaging said vertical surfaces, and, when assembled to the box, a lower end of said meter retaining said projections in said slots.

6. A meter boundary box according to claim 1 further comprising at least one non-return valve within said outlet passage.

7. A meter boundary box according to claim 1 further comprising a retention ring releasably engaging an upper end of said manifold sleeve and having a surface which inhibits disengagement of said valve member from said upwardly open thread by abutment with an upper end of the valve member upon opening of the closure valve.

8. A meter boundary box according to claim 1 wherein said upper housing end and lid have inter-engaging surfaces which inhibit relative rotary movement but permit axial movement for removal of the lid from the housing.

9. A meter boundary box according to claim 1 further comprising a casing enclosing said tubular housing and said water meter, said casing having a pair of height adjustment spacer rings each having inter-engaging castellated steps contiguous with complementary steps of the other, the contiguous edges comprising portions which slope in a generally spiral manner.

* * * * *